UNITED STATES PATENT OFFICE.

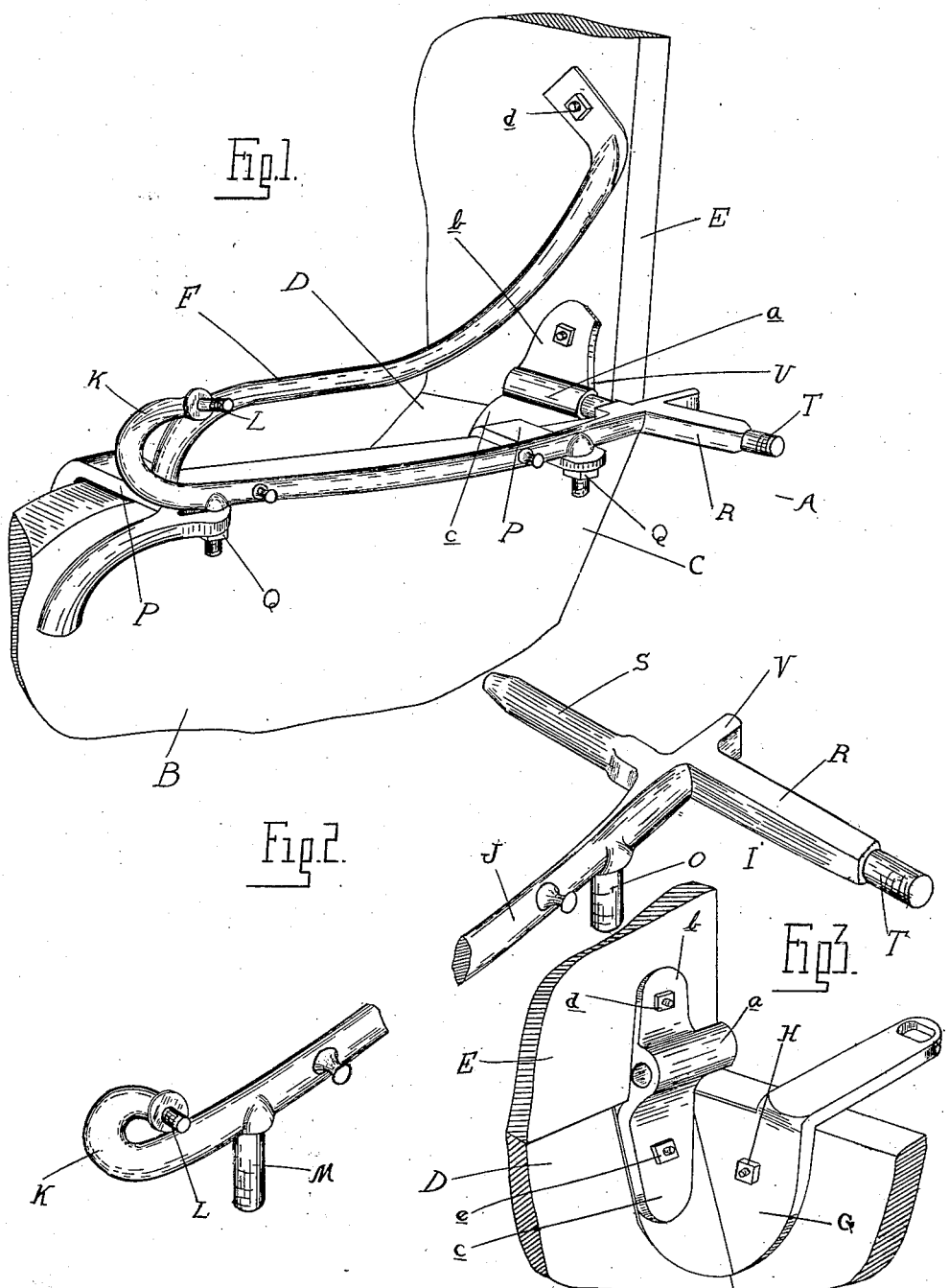

DAVID W. CONNELL, OF PONTIAC, MICHIGAN, ASSIGNOR TO PONTIAC BUGGY COMPANY, OF PONTIAC, MICHIGAN, A CORPORATION OF MICHIGAN.

SHIFTING-RAIL.

No. 914,702.   Specification of Letters Patent.   Patented March 9, 1909.

Application filed March 26, 1908. Serial No. 423,966.

*To all whom it may concern:*

Be it known that I, DAVID W. CONNELL, a citizen of the United States of America, residing at Pontiac, in the county of Oakland and State of Michigan, have invented certain new and useful Improvements in Shifting-Rails, of which the following is a specification, reference being had therein to the accompanying drawings.

The invention relates generally to a detachable shifting rail for vehicles, and consists in the novel construction of the rail, in the means for detachably connecting the same to the vehicle seat, and further in certain details of construction as will be more fully hereinafter set forth.

In the drawings,—Figure 1 is a sectional perspective view of a vehicle seat with my improved shifting rail attached thereto; Fig. 2 is a similar view of the shifting rail detached; and Fig. 3 is a sectional perspective view of a corner of the vehicle seat, illustrating the means of attachment of the socket member.

In the drawings thus briefly described, A represents the seat of any ordinary construction, comprising the bottom B, side panels C, a rear panel D, and the usual lazy-back E.

F designates the side rail, and G the corner irons uniting each side panel with the rear, as shown in Fig. 3, each iron being connected to the side panel by a suitable bolt H.

I represents my improved shifting rail adapted to be detachably secured to the vehicle seat, and so connected to the latter that the connections will be inconspicuous, the construction and arrangement being such that the main brace or connecting member intermediate the rail and the seat will be covered by the upholstering.

In construction, the rail comprises a longitudinally-extending body section J, terminating at its forward end in a return-bend K, which in turn terminates in a lateral threaded projection L constituting a support for the top bow. Near the forward and rear ends of the body section are the usual depending threaded stems M and O that are adapted to engage apertured lugs P secured to the seat sides, and to be held in place by suitable nuts Q. Near the rear end the rail body is provided with two oppositely disposed arms R and S extending substantially in the same horizontal plane, the outwardly-projecting arm R having the usual threaded extension T and constituting a support for the top prop block. The inwardly-projecting arm S is adapted to engage loosely within a socket member U which is secured to the vehicle seat, one at each side thereof in the manner indicated in Fig. 1, this latter arm constituting a brace connection between the bar and the vehicle, providing the necessary strength and rigidity for the shifting rail.

The outwardly-opening socket portion proper *a* is located at the junction of the rear panel D and the lazy-back E, and is provided with oppositely-disposed apertured ears *b c* secured respectively to the lazy-back and the rear panel, as shown in Fig. 3. A bolt, as *d*, serves as a fastening for the ear *b*, while a similar bolt *e* unites the ear *c* to the rear panel, a single bolt serving to hold the adjoining portions of the socket member and the corner rail in place. The extreme rear portion of the body section J of the rail, indicated by the reference letter V, forms the usual stop lug, this portion projecting a slight distance as shown beyond the supporting arm R.

In its application to the vehicle seat, the shifting rail is held in such relation to the side panel as to permit the lateral insertion of the shank S within its socket, and after such engagement has been effected the rail is turned or rocked downwardly about the socket as a pivot until the projections M and O engage the socket members P. The nuts are then applied to the threaded ends of the projections and the rail locked in place.

What I claim as my invention is,—

1. In combination with a vehicle seat, of a horizontal and a vertical socket at the seat end spaced apart, and a detachable shifting rail having a laterally-projecting arm near one end engageable within the horizontal socket, and a projection distant from the arm insertible within the vertical socket upon rotation of the rail about the first-mentioned socket as a pivot.

2. In combination with a socket adapted to be attached to the seat of a vehicle, of a shifting rail comprising a body section of a length corresponding to that of the seat end or side panel to which the socket is secured, complementary supporting arms substantially equal in length projecting laterally from opposite sides of the body near its rear end, and depending projections upon the body adapted to engage brackets upon the vehicle seat, one of said laterally projecting arms rotatably engaging the socket.

3. The combination with a vehicle seat, of a detachable shifting rail comprising a longitudinal body section of a length corresponding to that of the seat side to which the rail is adapted to be attached, complementary supporting arms substantially equal in length and projecting laterally from opposite sides of and substantially in the plane of the body near the rear end thereof, and depending threaded projections upon the body adapted to engage brackets upon the vehicle seat, and a laterally - projecting outwardly - opening socket upon the seat with which the inner supporting arm slidingly engages.

4. The combination with a vehicle seat including rear and side panels and a lazy-back, of a socket member rigidly attached to, and at one side of, the seat at the junction of the rear panel and the back, brackets projecting laterally from the side panel, a shifting rail extending longitudinally of said side panel having downwardly projecting lugs detachably engaging the brackets, and provided in proximity to its rear end with complementary supporting arms projecting laterally from opposite sides of the body in substantially the plane of the latter, the inner supporting arm slidingly engaging the socket and the rear extremity of the body section forming a stop lug beyond the arms.

In testimony whereof I affix my signature in presence of two witnesses.

DAVID W. CONNELL.

Witnesses:
S. E. BEACH,
L. L. DUNLAP.